United States Patent
Dyle

(10) Patent No.: US 9,751,467 B2
(45) Date of Patent: Sep. 5, 2017

(54) CARGO BARRIER FOR A VEHICLE

(71) Applicant: GM GLOBAL TECHNOLOGY OPERATIONS LLC, Detroit, MI (US)

(72) Inventor: Taryn Dyle, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 14/798,976

(22) Filed: Jul. 14, 2015

(65) Prior Publication Data

US 2017/0015249 A1    Jan. 19, 2017

(51) Int. Cl.
*B60R 5/04*     (2006.01)
*B60R 21/02*    (2006.01)

(52) U.S. Cl.
CPC .............. *B60R 5/04* (2013.01); *B60R 21/026* (2013.01)

(58) Field of Classification Search
CPC .......... B60R 5/04; B60R 5/042; B60R 21/026; B60N 2/3011
See application file for complete search history.

(56) References Cited

U.S. PATENT DOCUMENTS

2007/0013201 A1*   1/2007   Wagner ............... B60N 2/3011
                                                        296/24.43

* cited by examiner

*Primary Examiner* — Glenn Dayoan
*Assistant Examiner* — Melissa A Black
(74) *Attorney, Agent, or Firm* — Quinn IP Law

(57) ABSTRACT

A barrier for separating a cargo area from a passenger area of a vehicle includes a support structure that is fixedly attached to a frame of a rear seat, adjacent a seatback of the seat. A gate is attached to and supported by the support structure, and is rotatably moveable relative to the support structure between a stowed position and a deployed position. A latch mechanism automatically secures the gate relative to the support structure when the gate is in the deployed position. A release system is coupled to the latch mechanism for moving the latch mechanism into a release position to allow the gate to rotate back into the stowed position.

16 Claims, 5 Drawing Sheets

CARGO BARRIER FOR A VEHICLE

TECHNICAL FIELD

The disclosure generally relates to a cargo barrier for a vehicle.

BACKGROUND

Vehicles (SUVs) may include an interior space that may be separated into a main passenger area, and a cargo area, with the cargo area being located rearward of a rear passenger seat of the vehicle. Devices may separate or provide a physical barrier between the cargo area and the main passenger area of the vehicle. Such barriers prevent objects from moving from the cargo area into the passenger area.

SUMMARY

A vehicle includes a seat and a barrier. The seat includes a frame, and presents a seatback having a top vertical edge. The barrier includes a support structure and a gate. The support structure is attached to the frame of the seat. The gate includes an upper portion, is disposed adjacent the seatback, supported by the support structure, and is moveable between a stowed position and a deployed position. When the gate is disposed in the stowed position, the upper portion of the gate is disposed vertically no higher than the top vertical edge of the seatback. When the gate is disposed in the deployed position, the upper portion of the gate at least partially extends vertically above the top vertical edge of the seatback.

A cargo barrier for a vehicle is also provided. The cargo barrier includes a support structure that is configured for attachment to a frame of a seat of the vehicle. A pin is attached to the support structure. The pin defines a rotation axis. A gate is supported by the pin, and is rotatable about the rotation axis of the pin. The gate is moveable between a stowed position and a deployed position. A latch mechanism includes a pin that is moveable between a lock position and a release position. When the pin is disposed in the lock position, the pin is operable to secure the gate in the deployed position, relative to the support structure. When the pin is disposed in the release position, the pin is operable to allow the gate to move relative to the support structure.

Accordingly, the cargo barrier may be easily installed directly onto the frame of the seat. Once installed, the gate of the barrier may be easily moved between the deployed position to present a physical barrier between a cargo area and a passenger area of the vehicle, and the stowed position to allow movement between the cargo area and the passenger area. The barrier is easily deployed by simply rotating the gate into the deployed position, whereby the latch mechanism may automatically secure the gate relative to the support structure in the deployed position. A release system is provided to release the latch mechanism, thereby allowing the gate to rotate back into the stowed position for convenient storage when not needed.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. Preferably, the vehicle 20 may be configured as an SUV, a crossover, or some other similarly configured vehicle 20 having a passenger area 22 open to a rear cargo area 24. However, it should be appreciated that the teachings of the disclosure may be incorporated into other types of vehicles, such as sedans, trucks, vans, etc.

Figure 1:
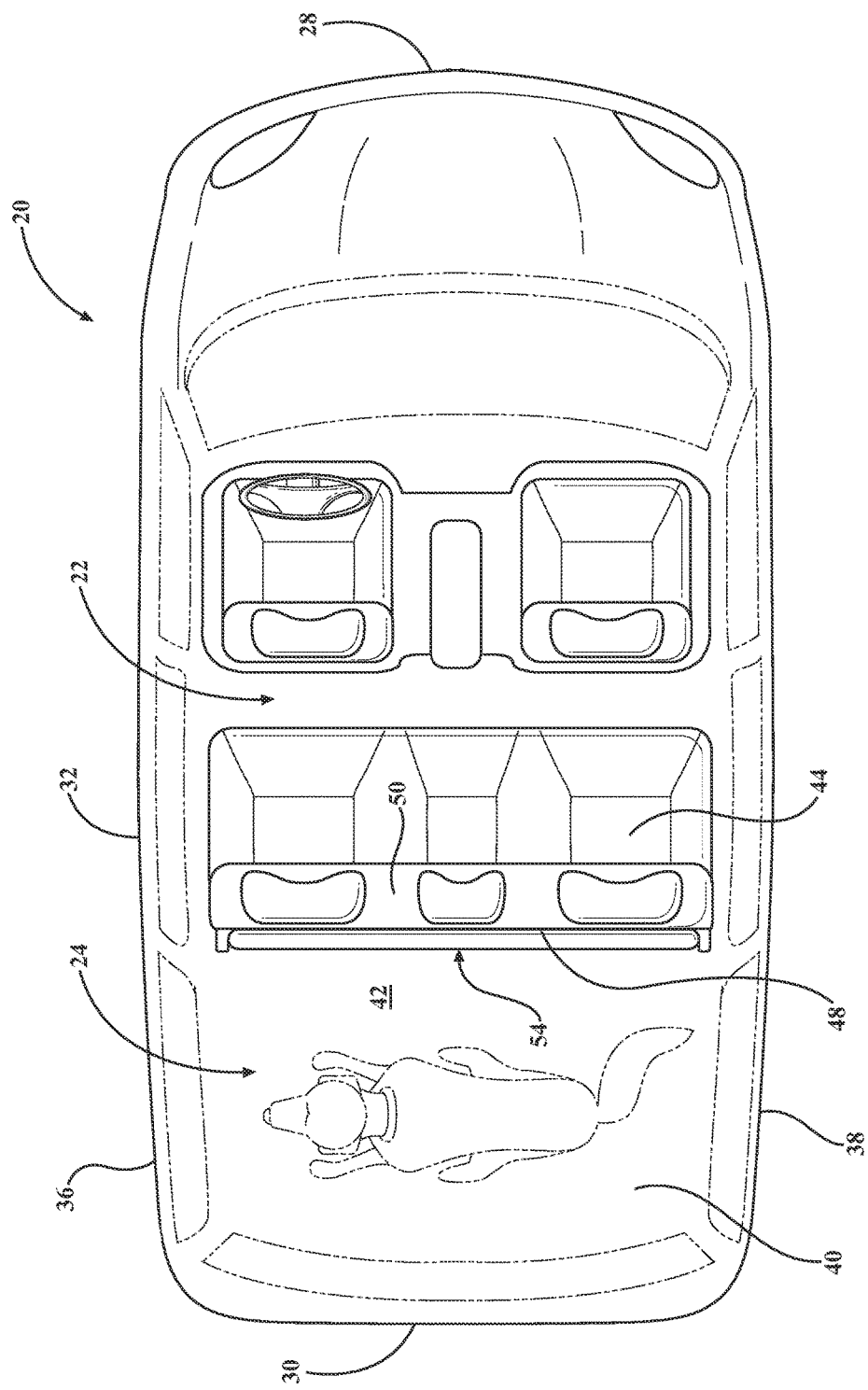
FIG. 1 is a schematic plan view of a vehicle showing a barrier.
Figure 2:
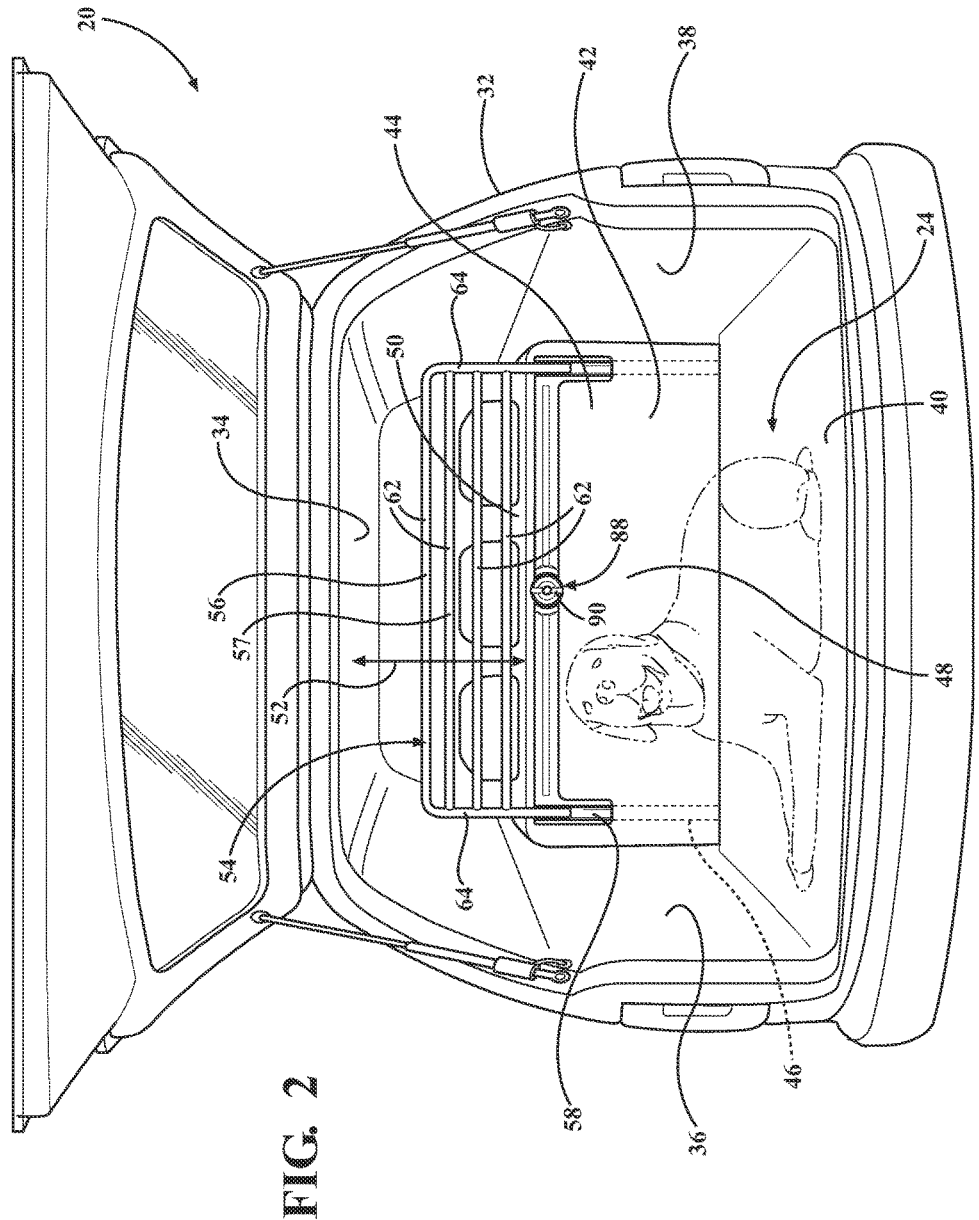
FIG. 2 is a schematic end view of the vehicle showing the barrier in a deployed position.
Figure 3:
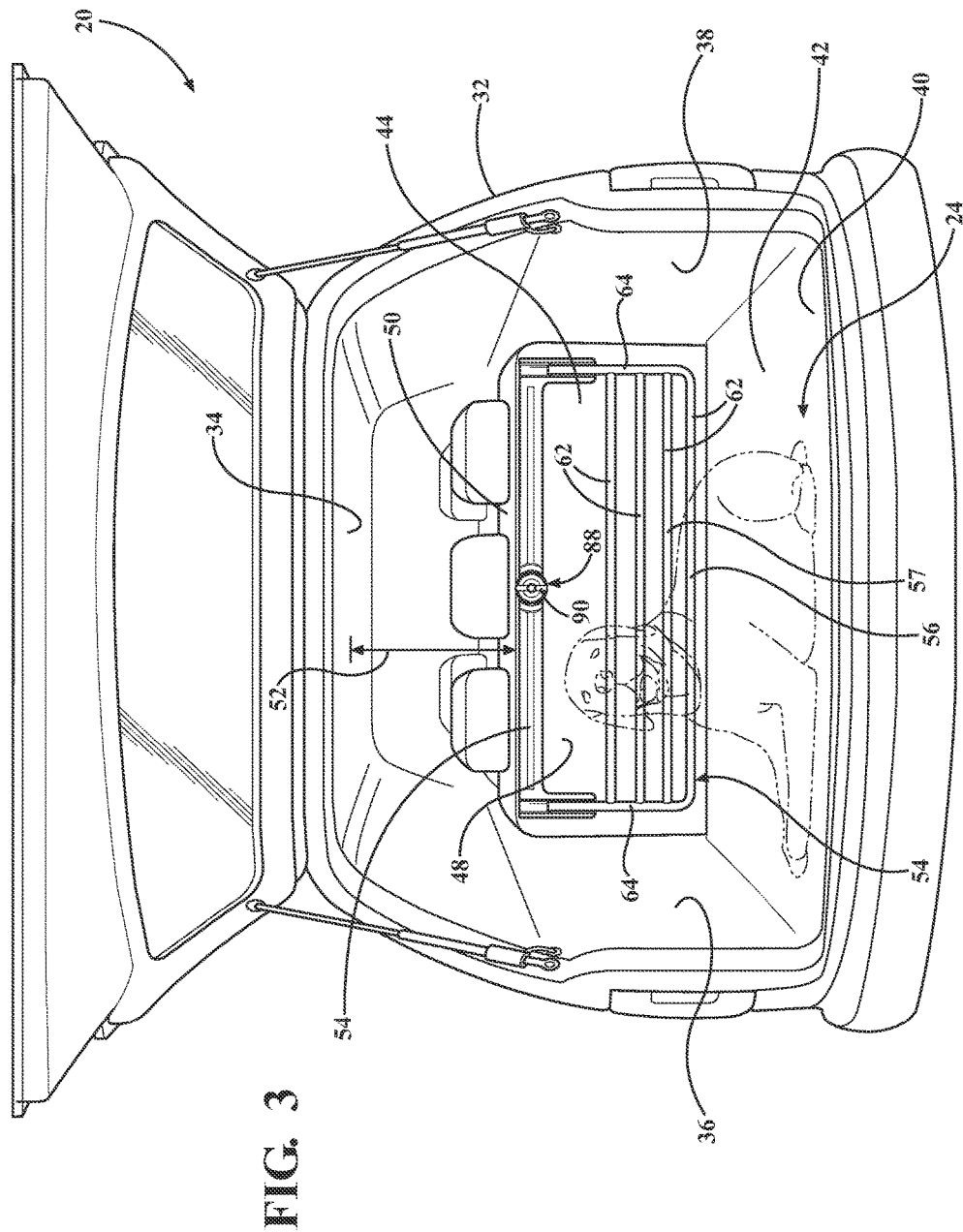
FIG. 3 is a schematic end view of the vehicle showing the barrier in a stowed position.

Referring to FIG. 1, the vehicle 20 extends between a forward end 28 and a rearward end 30. Referring also to FIGS. 2 and 3, the vehicle 20 includes a body 32 having a roof 34, a first sidewall 36, a second sidewall 38, and a floor 40. The roof 34, the first sidewall 36, the second sidewall 38, and the floor 40 generally cooperate together to define an enclosed, interior space 42. As best shown in FIG. 1, the vehicle 20 includes at least one seat 44 that is disposed within the interior space 42 of the vehicle 20. As shown and described herein, the seat 44 is a rear seat 44 of the vehicle 20, and is disposed nearer the rearward end 30 of the body 32 than any of the other seats. However, it should be appreciated that the seat 44 may be defined as any one of the other seats of the vehicle 20. As shown in FIG. 1, the cargo area 24 of the interior space 42 is disposed rearward of the seat 44, adjacent the rearward end 30 of the body 32, and the passenger area 22 of the interior space 42 includes the seat 44 and extends toward the forward end 28 of the body 32.

Referring to FIGS. 2 and 3, the seat 44 includes a frame 46. The frame 46 provides a rigid structure that supports that various parts and/or components of the seat 44, such as but not limited to seat 44 cushions, supplemental restraint systems, seatbelts, etc. The frame 46 is fixedly attached to the body 32 in any suitable manner, such as with a bolted connection (not shown) attaching the frame 46 to the body 32. The frame 46 presents a seatback 48. Referring also to FIG. 1, the seatback 48 is the portion of the seat 44 facing or disposed nearest the rearward end 30 of the body 32, i.e., the back of the seat 44. Referring to FIGS. 2 and 3, the seatback 48 includes a top vertical edge 50. The top vertical edge 50 of the seat 44 is spaced a gap distance 52 from the roof 34 of the body 32. Objects, such as but not limited to pets or other animals, may move between the cargo area 24 and the passenger area 22, through the space between top vertical edge 50 of the seatback 48 and the roof 34 that is defined by the gap distance 52.

Referring to FIGS. 2 and 3, in order to selectively block movement over the seatback 48, between the cargo area 24 and the passenger area 22, the seat 44 is equipped with a re-positionable barrier 54. The barrier 54 includes a gate 56 that is moveable between a deployed position, shown in FIG. 2, and a stowed position, shown in FIG. 3. The gate includes an upper portion 57. When the gate 56 is disposed in the stowed position, the upper portion 57 of the gate 56 is disposed vertically no higher than the top vertical edge 50 of the seatback 48. Accordingly, when the gate 56 is disposed in the stowed position, the upper portion 57 of the gate 56 is nested against the seatback 48, such that the upper portion 57 of the gate 56 extends vertically below the top vertical edge 50 of the seatback 48, and does not extend vertically above the top vertical edge 50 of the seatback 48. When the gate 56 is disposed in the deployed position, the upper portion 57 of the gate 56 is positioned to extend vertically above the top vertical edge 50 of the seatback 48, into the space between the top vertical edge 50 of the seatback 48 and the roof 34 defined by the gap distance 52.

Referring to FIGS. 2 and 3, the barrier 54 includes a support structure 58 and the gate 56. The support structure 58 is fixedly attached to the frame 46 of the seat 44. The support structure 58 may be attached to the frame 46 of the seat 44 in any suitable manner. For example, the vehicle 20 may include at least one, but preferably a plurality of fasteners 60 that attach the support structure 58 of the barrier 54 to the frame 46 of the seat 44. For example, the fasteners 60 may include a threaded fastener, such as a bolt or a screw, that are disposed in threaded engagement with the frame 46 of the seat 44 to attach the barrier 54 to the frame 46 of the seat 44. Notably, the barrier 54 may not be attached to or supported by the roof 34, the first sidewall 36, the second sidewall 38, or the floor 40. Rather, the barrier 54 may only be attached to the seat 44 by the fixed connection between the support structure 58 and the frame 46. The barrier 54 does not rest on the floor 40 or the roof 34, but rather, is fully supported by the seat 54.

The gate 56 is disposed adjacent the seatback 48, at the rearward side of the seat 44. The gate 56 is supported by the support structure 58 relative to the seat 44. As noted above, the gate 56 is moveable between the stowed position and the deployed position. The gate 56 extends vertically below the top vertical edge 50 of the seatback, and does not extend vertically above the top vertical edge 50 of the seatback 48 when the gate 56 is disposed in the stowed position. The gate 56 at least partially extends vertically above the top vertical edge 50 of the seatback 48 when the gate 56 is disposed in the deployed position. The gate 56 may be configured in any suitable manner to block movement over the top vertical edge 50 of the seatback 48. As shown, the gate 56 is comprised of a plurality of parallel, horizontally extending bars 62 that extend between two vertically extending posts 64. As shown, the gate 56 may prevent movement over the top vertical edge 50 of the seatback 48 of anything larger than the space between the horizontal bars 62. However, it should be appreciated that the gate 56 may be configured in some other manner, such as with a screen defining much smaller openings to block movement of much smaller objects.

Figure 4:
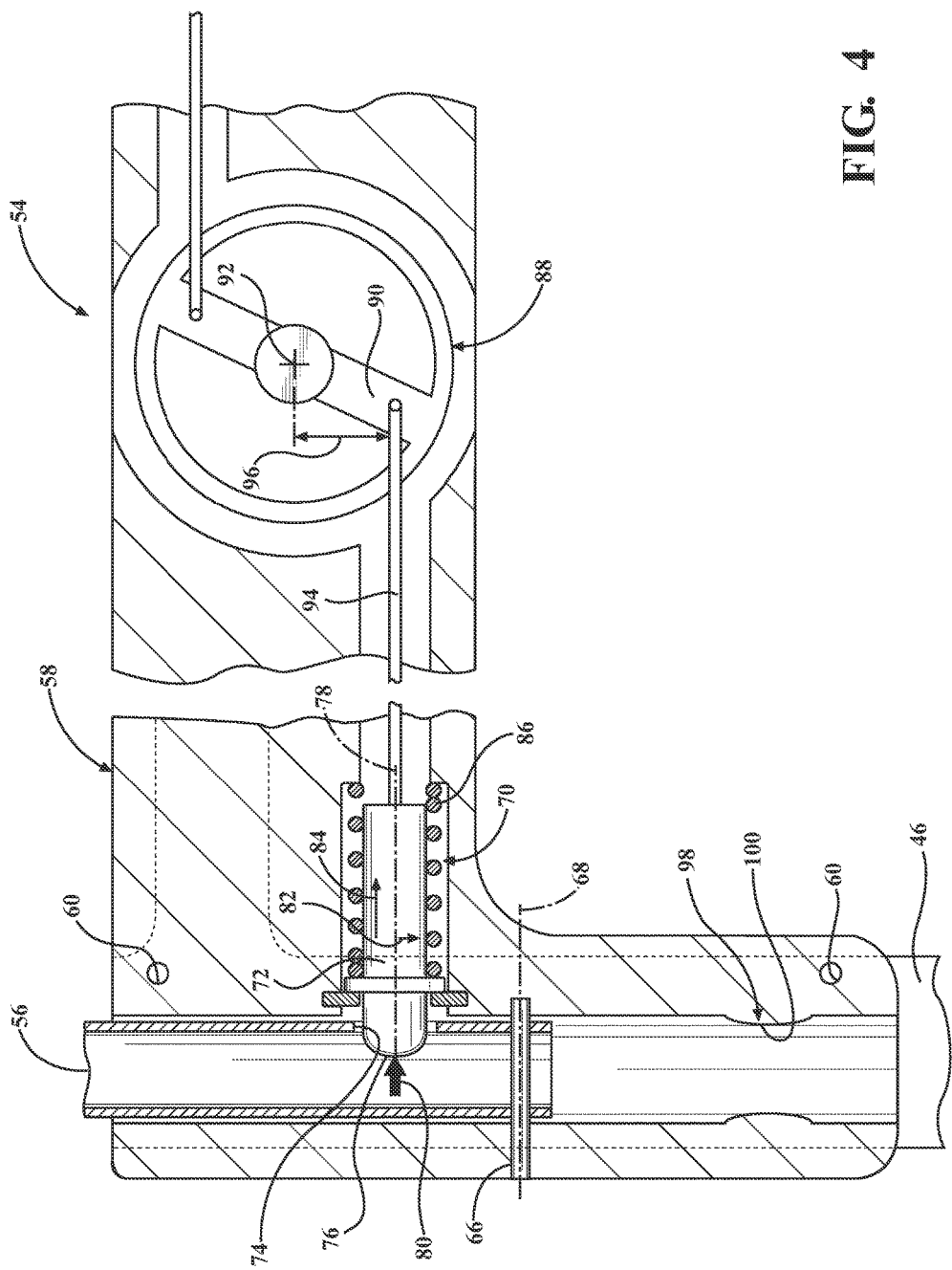
FIG. 4 is an enlarged, fragmentary cross sectional view of the barrier in the deployed position, with a latch mechanism in a lock position.
Figure 5:
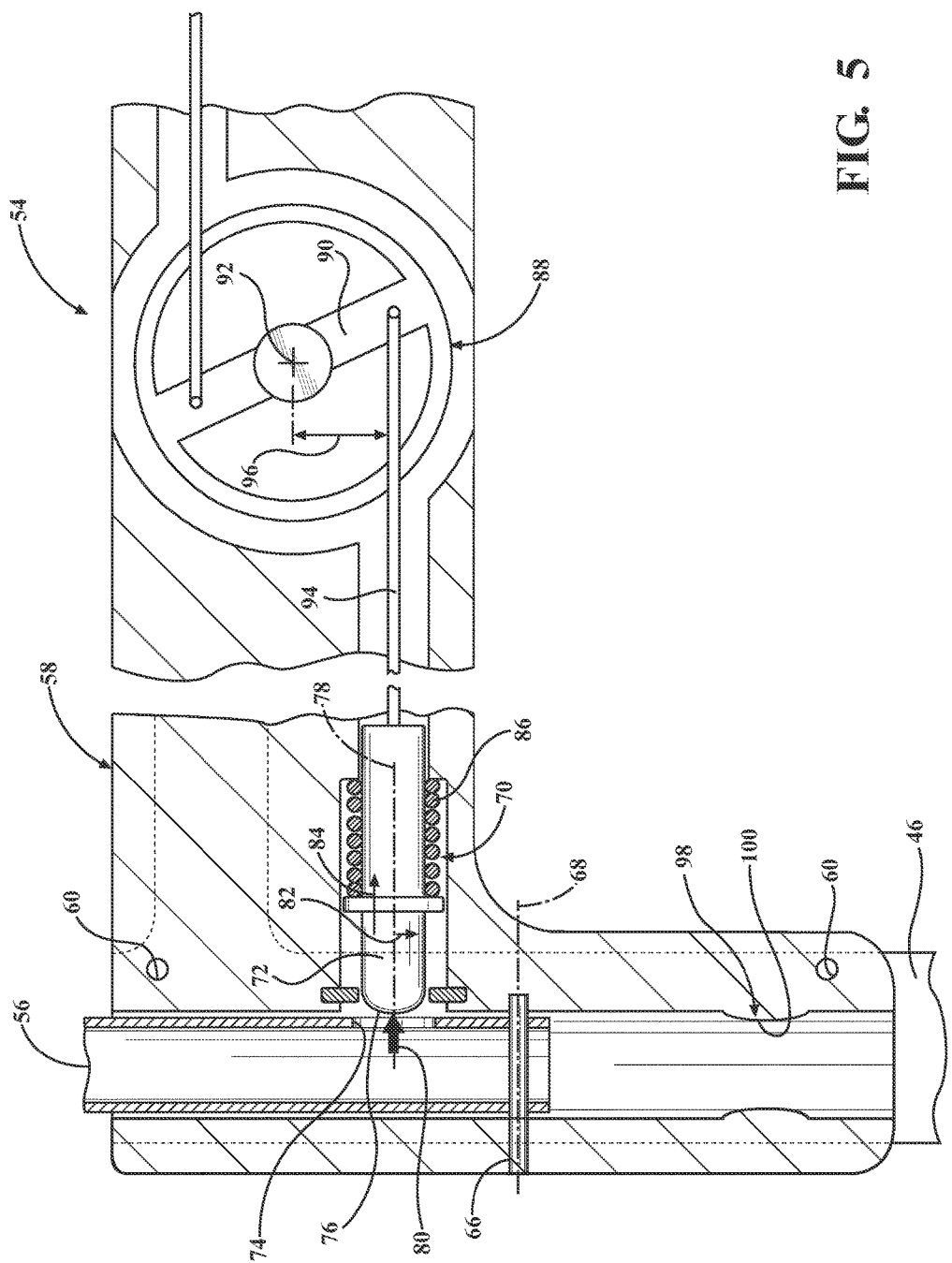
FIG. 5 is an enlarged, fragmentary cross sectional view of the barrier in the deployed position, with the latch mechanism in a release position.

As shown in FIGS. 2 and 3, the gate 56 may be connected to the support structure 58 at two different locations, at laterally opposite sides of the seat 44. These connections are identical, and are mirror images of each other. For clarity, only the left or driver's side connection is shown in FIGS. 4 and 5, and described in detail herein. However, it should be appreciated that the description of the connection between the gate 56 and the support structure 58, specifically describing the left side of the barrier 54 and shown in FIGS. 4 and 5, is applicable to the right side of the barrier 54.

Referring to the example shown in FIGS. 4 and 5, the barrier 54 of this embodiment may include a pin 66 that interconnects the support structure 58 and the gate 56. The pin 66 is supported by the support structure 58, and defines a rotation axis 68 about which the gate 56 rotates. The gate 56 is rotatably coupled the pin 66, and is rotatable about the rotation axis 68 relative to the support structure 58. As such, the support structure 58 rotatably supports the gate 56, such that the gate 56 is rotatable relative to the support structure 58 between the stowed position and the deployed position. While the exemplary embodiment shown in the Figures and described herein describes the gate 56 as being rotatably moveable between the stowed position and the deployed position, it should be appreciated that the barrier 54 may be configured differently, such that the gate 56 is moveable in some other manner, such as through a sliding or lifting movement.

The barrier 54 includes a latch mechanism 70. The latch mechanism 70 is moveable between a lock position, shown in FIG. 4, and a release position, shown in FIG. 5. When disposed in the lock position, the latch mechanism 70 is operable to secure the gate 56 in the deployed position, relative to the support structure 58. When disposed in the release position, the latch mechanism 70 is operable to allow the gate 56 to move relative to the support structure 58.

The latch mechanism 70 may be configured in any suitable manner capable of moving between the lock position and the release position. By way of an exemplary embodiment, the latch mechanism 70 may include a pin 72 that is supported by the support structure 58. The pin 72 is automatically moveable into the lock position for interlocking engagement with an aperture 74 of the gate 56 when the gate 56 is disposed in the deployed position.

The pin 72 may include a rounded end 76 for engaging the gate 56. As used herein, the term "rounded" should be interpreted to include a chamfered end, a beveled end or some other angled end relative to a longitudinal axis 78 of the pin 72, as well as the semi-spherical end shown in the Figures. Movement of the gate 56 into the deployed position brings the gate 56 into contact with the rounded end 76 of the pin 72. Further application of a force onto the gate 56 imparts a force 80 onto the pin 72. The force 80 is transmitted to the pin 72 through the rounded end 76 of the pin 72. The rounded end 76 bifurcates the applied force 80 into a first force component 82 and a second force component 84. The second force component is hereinafter referred to as the axial force component 84. The axial force component 84 is directed along the longitudinal axis 78 of the pin 72. The axial force component 84 urges or moves the pin 72 along the longitudinal axis 78 of the pin 72, from the lock position into the release position, thereby allowing the gate 56 to move past the pin 72 until the pin 72 is aligned with the aperture 74 in the gate 56, at which point the axial force component 84 is released and the pin 72 moves through the aperture 74 into the lock position and interlocking engagement with the gate 56.

The latch mechanism 70 may include a biasing device 86 that is operable to bias the pin 72 into the lock position. As shown in FIG. 4, the biasing device 86 includes a coil spring that is configured to bias the pin 72 against the support structure 58 to move the pin 72 into the lock position. It should be appreciated that the latch mechanism 70 described above and shown in the Figures is merely an exemplary embodiment, and that the latch mechanism 70 may be configured in some other manner not shown or described herein.

Referring to FIGS. 4 and 5, the barrier 54 further includes a release system 88. The release system 88 is coupled to the latch mechanism 70. The release system 88 is operable to move the latch mechanism 70 from the lock position, shown in FIG. 4, into the release position, shown in FIG. 5. The release system 88 may be configured in any suitable manner capable of moving the latch mechanism 70 from the lock position into the release position. By way of an exemplary embodiment, the release system 88 may include a lever 90 that is coupled to the pin 72 of the latch mechanism 70. The lever 90 is rotatable relative to the support structure 58 about a lever axis 92. Preferably, a cable 94 extends between and connects the pin 72 and the lever 90. The cable 94 is attached to the lever 90 an arm distance 96 from the lever axis 92, so as to generate a moment or torque when the lever 90 is rotated. Rotation of the lever 90, from the position shown in FIG. 4 to the position shown in FIG. 5, moves the cable 94, and thereby the pin 72, along the longitudinal axis 78 of the pin 72, from the lock position into the release position. When the lever 90 is released, the biasing device 86 automatically biases the pin 72 back into the lock position.

Referring to FIGS. 4 and 5, the barrier 54 may further include a detent system 98. The detent system 98 releasably secures the gate 56 to the support structure 58 when the gate 56 is disposed in the stowed position. The detent system 98 may be configured in any suitable manner capable of securing the gate 56 in the stowed position relative to the support structure 58. By way of an exemplary embodiment, the detent system 98 may include a ridge 100 defined by the support structure 58 and operable to engage the gate 56 in frictional engagement when the gate 56 is disposed in the stowed position. When the gate 56 is moved into the stowed position, the gate 56 engages the ridge 100 and is pressed into a snug, frictional fit therebetween. However, only minimal force is required to dislodge the gate 56 from the ridge 100, and move the gate 56 back into the deployed position.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
a seat having a frame and presenting a seatback having a top vertical edge; and
a barrier including:
a support structure attached to the frame of the seat; and
a gate disposed adjacent the seatback and supported by the support structure, the gate having an upper portion and being moveable between a stowed position and a deployed position;
a detent system releasably securing the gate to the support structure in the stowed position;
wherein the upper portion of the gate is disposed vertically no higher than the top vertical edge of the seatback when the gate is disposed in the stowed position; and
wherein the upper portion of the gate at least partially extends vertically above the top vertical edge of the seatback when the gate is disposed in the deployed position.

2. The vehicle set forth in claim 1 wherein the support structure rotatably supports the gate, such that the gate is rotatable relative to the support structure between the stowed position and the deployed position.

3. The vehicle set forth in claim 2 wherein the barrier includes a pin rotatably interconnecting the support structure and the gate.

4. The vehicle set forth in claim 1 wherein the barrier includes a latch mechanism moveable between a lock position operable to secure the gate in the deployed position, relative to the support structure, and a release position operable to allow the gate to move relative to the support structure.

5. The vehicle set forth in claim 4 wherein the barrier includes a release system coupled to the latch mechanism and operable to move the latch mechanism from the lock position into the release position.

6. The vehicle set forth in claim 5 wherein the latch mechanism includes a pin supported by the support structure and automatically moveable into the lock position for interlocking engagement with an aperture of the gate when the gate is disposed in the deployed position.

7. The vehicle set forth in claim 6 wherein the latch mechanism includes a biasing device biasing the pin into the lock position.

8. The vehicle set forth in claim 7 wherein the pin includes a rounded end for engaging the gate, wherein movement of the gate into the deployed position brings the gate into contact with the rounded end of the pin, thereby creating an axial force component directed along a longitudinal axis of the pin that urges the pin into the release position.

9. The vehicle set forth in claim 6 wherein the release system includes a lever coupled to the pin of the latch mechanism, and rotatable relative to the support structure about a lever axis, wherein rotation of the lever moves the pin along a longitudinal axis of the pin, from the lock position into the release position.

10. The vehicle set forth in claim 9 wherein the release system includes a cable connecting the pin and the lever, wherein the cable is attached to the lever a distance from the lever axis.

11. The vehicle set forth in claim 1 further comprising at least one fastener attaching the support structure to the frame of the seat.

12. The vehicle set forth in claim 11 wherein the at least one fastener includes a threaded fastener in threaded engagement with the frame of the seat.

13. A vehicle comprising:
a body having a roof, a first sidewall, a second sidewall, and a floor cooperating together to define an interior space;
a seat having a frame and presenting a seatback having a top vertical edge; and
a barrier that is not attached to or supported by the roof, the first sidewall, the second sidewall, or the floor, the barrier including:
a support structure attached to the frame of the seat; and
a gate disposed adjacent the seatback and supported by the support structure, the gate having an upper portion and being moveable between a stowed position and a deployed position;

wherein the upper portion of the gate is disposed vertically no higher than the top vertical edge of the seatback when the gate is disposed in the stowed position; and wherein the upper portion of the gate at least partially extends vertically above the top vertical edge of the seatback when the gate is disposed in the deployed position.

14. A cargo barrier for a vehicle, the cargo barrier comprising:

a support structure configured for attachment to a frame of a seat of the vehicle;

a pin attached to the support structure and defining a rotation axis;

a gate supported by the pin and rotatable about the rotation axis of the pin, wherein the gate is moveable between a stowed position and a deployed position;

a latch mechanism having a pin moveable between a lock position operable to secure the gate in the deployed position, relative to the support structure, and a release position operable to allow the gate to move relative to the support structure;

a release system coupled to the latch mechanism and operable to move the pin of the latch mechanism along a longitudinal axis of the pin, from the lock position into the release position;

wherein the release system includes a lever coupled to the pin of the latch mechanism, and rotatable relative to the support structure about a lever axis, wherein rotation of the lever moves the pin along the longitudinal axis of the pin, from the lock position into the release position; and wherein the release system includes a cable connecting the pin and the lever, wherein the cable is attached to the lever a distance from the lever axis.

15. The cargo barrier set forth in claim 14 wherein the latch mechanism includes a biasing device biasing the pin into the lock position.

16. The cargo barrier set forth in claim 14 further comprising a detent system releasably securing the gate to the support structure in the stowed position, wherein the detent system includes a ridge defined by the support structure and operable to engage the gate in frictional engagement when the gate is disposed in the stowed position.

* * * * *